US006760295B1

(12) United States Patent
Maruyama

(10) Patent No.: US 6,760,295 B1
(45) Date of Patent: Jul. 6, 2004

(54) OPTICAL PICK-UP

(75) Inventor: Koichi Maruyama, Saitama-ken (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/473,684

(22) Filed: Dec. 29, 1999

(30) Foreign Application Priority Data

Jan. 8, 1999 (JP) .......................................... 11-002563

(51) Int. Cl.[7] ................................................ G11B 7/00
(52) U.S. Cl. .............................. 369/112.05; 369/112.07
(58) Field of Search ......................... 369/44.23, 112.07, 369/112.1, 112.12, 112.15, 112.24, 717, 718, 719, 565, 112.05, 112.06, 112.08, 653.2, 94, 112.22, 112.23, 112.03, 112.04

(56) References Cited

U.S. PATENT DOCUMENTS

| 5,303,221 | A | | 4/1994 | Maeda et al. |
| 5,446,565 | A | | 8/1995 | Komma et al. |
| 5,796,520 | A | * | 8/1998 | Maruyama .................. 359/565 |
| 6,084,843 | A | * | 7/2000 | Abe et al. .............. 369/112.07 |
| 6,088,322 | A | | 7/2000 | Broome et al. |

FOREIGN PATENT DOCUMENTS

| EP | 0747893 | 12/1996 |
| EP | 0828244 | 3/1998 |
| EP | 0851415 | 7/1998 |
| EP | 0865037 | 9/1998 |
| EP | 0881634 | 12/1998 |
| JP | 5303766 | 11/1993 |
| JP | 7-98431 | 4/1995 |
| JP | 9161307 | 6/1997 |
| JP | 9-288837 | 11/1997 |
| JP | 09306018 A | * 11/1997 |
| JP | 9-306108 | 11/1997 |
| JP | 10-27373 | 1/1998 |
| JP | 11-16194 | 1/1999 |
| WO | 00/00964 | 1/2000 |

OTHER PUBLICATIONS

"Dual Wavelength Optical Head for 0.6 mm and 1.2 mm Substrate Thicknesse", R. Katayama et al., Japanese Journal of Applied Physics., vol. 36, 1997, pp. 460–466, XP002133610, Tokyo, (ISSN: 0021–4922).
English Language Abstract of JP 9–288837.
English Language Abstract of JP 9–306108.
English Language Abstract of JP 11–16194.

* cited by examiner

Primary Examiner—Thang V. Tran
(74) Attorney, Agent, or Firm—Greenblum & Bernstein, P.L.C.

(57) ABSTRACT

An optical pick-up includes light sources for emitting light beams having different wavelength, the light sources being switched according to the kind of optical discs, a refractive lens element for converging the light beams from the light sources onto recording layer of the optical disc; and a spherical aberration correcting element on which a concentric phase grating structure is formed, the phase grating structure altering spherical aberration in response to change of wavelength to correct change of the spherical aberration due to change of the thickness of the cover layer. The spherical aberration correcting element has a wavelength dependence such that spherical aberration varies in the undercorrected direction as wavelength of incident light increases.

22 Claims, 9 Drawing Sheets

SPHERICAL
ABERRATION

ASTIGMATISM 221 222 211 212   D2

20

SPHERICAL
ABERRATION

ASTIGMATISM

SPHERICAL
ABERRATION

ASTIGMATISM

SPHERICAL
ABERRATION

ASTIGMATISM

SPHERICAL
ABERRATION

ASTIGMATISM

SPHERICAL
ABERRATION

ASTIGMATISM

OPTICAL PICK-UP

BACKGROUND OF THE INVENTION

The present invention relates to an optical pick-up of an optical disc apparatus that is able to record/reproduce data of a plurality of kinds of optical discs whose cover layers have different thickness. Particularly, the present invention relates to the optical pick-up that has a combination of a refractive lens element and a diffractive element.

The optical disc includes an information layer on which digital information is recorded, and a transparent cover layer that covers the information layer. A laser beam from the optical pick-up forms a beam spot on the information layer through the cover layer. The distance between the optical pick-up and the information layer varies depending upon the thickness of the cover layer.

Namely, the thicker the cover layer is, the farther the distance to the beam spot from the optical pick-up is. For example, since the cover layer of a compact disc (CD) or that of a CD-R has the thickness of 1.2 mm, and the thickness of the cover layer of a digital versatile disc (DVD) is 0.6 mm, the optical pick-up is required to move the beam spot away from the optical pick-up by 0.6 mm in the cover layer (0.4 mm in air) when the DVD is replaced with the CD or the CD-R.

Although a paraxial beam spot moves as the objective lens is moved, the change of the thickness of the cover layer changes spherical aberration. If the optical pick-up only moves the objective lens when the disc is replaced, wave front aberration of the laser beam is deteriorated. Thus, the diameter of the beam spot is increased, which prevents the optical disc apparatus from reproducing the recorded information from the CD. For instance, when the objective lens, which is designed to minimize the spherical aberration when the recorded information is reproduced from the DVD, is used for reproducing the information from the CD, the spherical aberration becomes too large to reproducing the information even if the objective lens moves to bring the beam spot to be coincident with the information layer.

Therefore, there is known as prior art, an optical pick-up that adjusts the condition of the laser beam entering into the objective lens according to the thickness of the cover layer.

For example, Japanese Provisional Patent Publication No. HEI 7-98431 discloses such an optical pick-up. The optical system shown in this publication employs a holographic lens on the laser source side of the objective lens to divide the laser beam from the laser source into a zero order parallel diffractive beam and a first order divergent diffractive beam. The zero order diffractive beam is used for the optical disc having a thinner cover layer (i.e., the DVD)) the first order diffractive beam is used for the optical disc having a thicker cover layer (i.e., the CD and CD-R). The optical pick-up of the publication enables to form the diffraction-limited beam spots for the respective optical discs when the holographic lens is designed to obtain the most suitable laser beams according to the thickness of the cover layers.

However, since the optical pick-up of the publication always divides the laser beam from the laser source into the zero and first order diffractive beams, and only one of these beams is used for recording/reproducing information at a time, the maximum efficiency in use of the light quantity is not more than 40%.

Further, when one of the diffractive beams is being used for recording/reproducing the information, the other diffractive beam is an unnecessary beam, which increases noise.

Still further, the recording density of the DVD is higher than that of the CD, which requires the optical pick-up for the DVD to form a smaller beam spot than the optical pick-up designed for the exclusive use of the CD (hereinafter referred as an exclusive CD pick-up). Since the diameter of the beam spot has a positive correlation with the wavelength of the laser beam, the optical pick-up for the DVD requires the laser source whose oscillation wavelength is 635 through 660 nm that is shorter than the oscillation wavelength of the exclusive CD pick-up (i.e. 780 through 830 nm). On the other hand, the reflection characteristics of the CD-R requires the laser source whose oscillation wavelength is about 780 nm.

Accordingly, when the optical pick-up having a single laser source as described in the publication employs a laser source that emits a laser beam having a shorter oscillation wavelength, it cannot reproduce the information from the CD-R.

SUMMARY OF THE INVENTION

It is therefore an object of the present invention to provide an objective lens for an optical pick-up, which is capable of recording/reproducing information on a plurality of kinds of the optical discs (e.g., CD, CD-R and DVD) whose cover layers are different in the thickness. Further, the present invention is aimed to provide a composite objective lens that has higher efficiency in use of the light quantity than the conventional optical pick-up as disclosed in the above-identified publication.

For the above object, according to the present invention, there is provided an improved optical pick-up, which includes:

a plurality of light sources for emitting light beams having different wavelength, the light sources being switched with each other according to the kind of optical disc, used;

a refractive lens element for converging the light beams from the light sources onto a recording layer of the optical disc; and a spherical aberration correcting element on which a concentric phase grating structure is formed, the phase grating structure altering spherical aberration in response to change of wavelength to correct change of the spherical aberration due to change of the thickness of the cover layer.

With this construction, since the spherical aberration correcting element changes spherical aberration corresponding to a change of the wavelength of the laser beam, the switch of the laser sources can compensate a change of spherical aberration due to the change of the cover layer's thickness.

The spherical aberration correcting element preferably has no paraxial power, and diffracts the light beams in the same diffractive order, for example, in a first diffractive order.

Further, the light source having shorter emitting wavelength may be used for the optical disc having a thinner cover layer that has higher recording density, and the light source having a longer emitting wavelength may be used for the optical disc having a thicker cover layer that has lower recording density. In such a case, the peripheral area of the spherical aberration correcting element is preferably optimized for the optical disc having the thinner cover layer with the shorter wavelength. The peripheral area is the outside of an effective diameter corresponding to numerical aperture required for the optical disc having the thicker cover layer.

In other definition, the peripheral area is the outside of a 85% line of an effective diameter of the spherical aberration correcting element. The peripheral area may be formed as a continuous surface or a grating surface. In the later case, a blazed wavelength of the peripheral area should be shorter than that of the central area.

The spherical aberration correcting element maybe located between the light sources and the refractive lens element. The refractive lens element and the spherical aberration correcting element constitute a composite objective lens. The composite objective lens may be designed for an infinite system in which parallel light beams are incident on the lens or a finite system in which divergent light beams are incident on the lens. In the infinite system, a collimator lens is required between the light sources and the composite objective lens.

Further, the spherical aberration correcting element preferably has a wavelength dependence such that spherical aberration varies in the undercorrected direction as wavelength of incident light increases.

As described above, the spherical aberration varies in the overcorrected direction as the thickness of the cover layer increases. Therefore, when a longer wavelength laser source is used for an optical disc having a thicker cover layer, and a shorter wavelength laser source is used for an optical disc having a thinner cover layer, the change of the spherical aberration due to change of the cover layer's thickness is corrected by the above-mentioned wavelength dependence of the spherical aberration correcting element.

An additional optical path length added by the phase grating structure is expressed by the following optical path difference function $\Phi(h)$:

$$\Phi(h) = (P_2 h^2 + P_4 h^4 + P_6 h^6 + \ldots) \times \lambda$$

where $P_2$, $P_4$ and $P_6$ are diffractive coefficients of second, fourth and sixth orders, h is a height from the optical axis and $\lambda$ is wavelength of incident light.

The phase grating structure of the spherical aberration correcting element may satisfy the following condition (1);

$$-15 < \Phi(h_{45})/\lambda - P_2 \times (h_{45})^2 < -7 \tag{1}$$

where $h_{45}$ is the height from the optical axis of a point where a light ray whose NA is 0.45 intersects the phase grating structure.

Preferably, one surface of the spherical aberration correcting element is a continuous surface and the other surface thereof is the grating surface. A base curve of the grating surface may be a flat plane or a rotationally symmetrical aspherical surface. The base curve is defined as a shape of the surface that does not include the phase grating structure.

DESCRIPTION OF THE ACCOMPANYING DRAWINGS

FIG. 3B is a cross-sectional view of the spherical aberration correcting element of FIG. 3A;

DESCRIPTION OF THE EMBODIMENTS

First Embodiment

Figure 1:
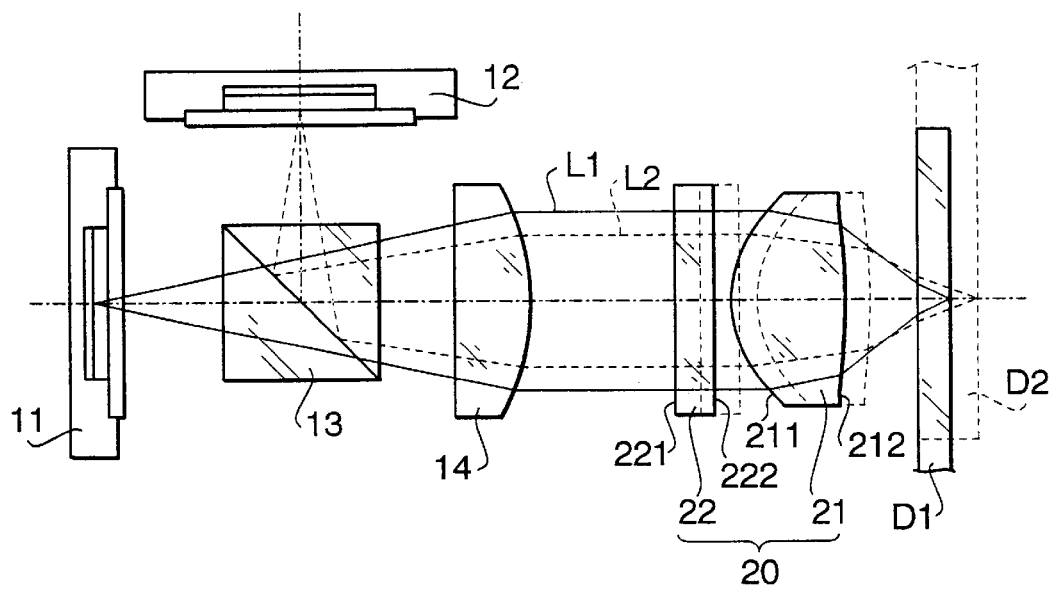
FIG. 1 shows an optical system of an optical pick-up according to a first embodiment.

FIG. 1 shows an optical system of the optical pick-up according to a first embodiment. The optical pick-up is applied to an optical disc apparatus that is capable of recording/reproducing a plurality of kinds of optical discs (e.g., CD, CD-R and DVD) provided with cover layers having different thickness.

The optical system of the optical pick-up includes a DVD module 11, a CD module 12, a beam combiner 13, a collimator lens 14 and a composite objective lens 20. Each of the modules 11 and 12 is provided with a semiconductor laser and a sensor that are mounted on a common substrate. The semiconductor lasers in the modules 11 and 12 emit laser beams having different wavelength and they are switched according to the kind of optical discs.

The optical system of the first embodiment is an infinite system. The laser beam from each module is converted into the parallel laser beam through the collimator lens 14 and is incident on the composite objective lens 20. The infinite system allows a change of the distance between the collimator lens 14 and the composite objective lens 20, which enables a separation arrangement where only the composite objective lens 20 moves along a radial direction of the optical disc and the light source portion, which includes the modules 11 and 12, the beam combiner 13 and the collimator lens 14, is fixed.

The composite objective lens 20 consists of a refractive lens element 21 and a spherical aberration correcting element 22. The composite objective lens 20 is mounted on a focus adjusting mechanism to adjust the lens position corresponding to the position of the information layer of the optical disc.

The refractive lens element 21 is a biconvex plastic lens having aspherical surfaces 211 and 212. The refractive lens element 21 has positive refractive power to converge the light beams from the modules 11 and 12 onto recording layers of the optical discs.

The spherical aberration correcting element 22 is provided with a concentric phase grating structure on the second surface 222. The first surface 221 is a continuous surface. The phase grating structure alters spherical aberration in response to change of wavelength to correct change of the spherical aberration due to change of the thickness of the cover layer. The shape of the phase grating will be described later.

The DVD is a thin cover type optical disc that has higher recording density and the thickness of the cover layer thereof is 0.6 mm. In order to form a fine beam spot on the DVD, a laser beam whose wavelength is within a range of 635 nm through 660 nm is required. On the other hand, the CD-R and the CD are thick cover type optical discs that have lower recording density. The thickness of the cover layer of the CD-R or the CD is 1.2 mm. The CD-R requires a laser beam of about 780 nm wavelength due to its spectral reflectance.

Therefore, a semiconductor laser of the DVD module 11 emits the laser beam of 657 nm wavelength, a semiconductor laser of the CD module 12 emits the laser beam of 780 nm or 785 nm wavelength.

The laser beam emitted from the semiconductor laser converges onto the information layer through the cover layer D1 (shown by a solid line) or D2 (shown by a dotted line).

When the thin cover type optical disc having the thin cover layer D1 is used, the DVD module 11 is operated to emit the laser beam L1 (shown by a solid line). The composite objective lens 20 is located at the position shown by a solid line. The laser beam L1 is converged onto the information layer of the thin cover type optical disc through the thin cover layer D1.

When the thick cover type optical disc having the thick cover layer D2 is used, the CD module 12 is operated to emit the laser beam L2 (shown by a dotted line). The composite objective lens 20 is moved to the position shown by a dotted line to follow the displacement of the recording layer. The laser beam L2 is converged onto the information layer of the thick cover type optical disc through the thick cover layer D2.

Figure 2A:
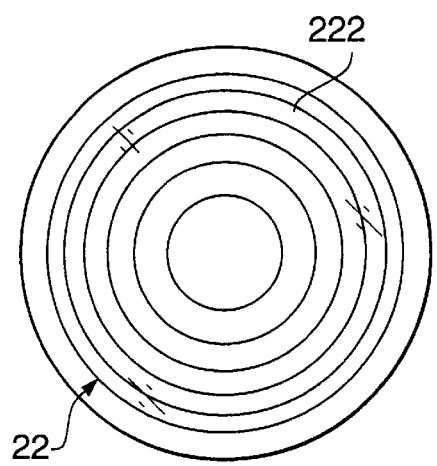
FIG. 2A is a front view of a spherical aberration correcting element used in the optical system of FIG. 1.
Figure 2B:
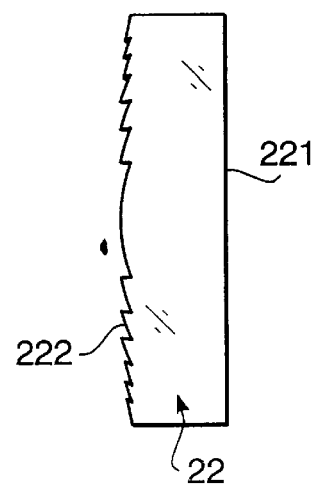
FIG. 2B is a cross-sectional view of the spherical aberration correcting element of FIG. 2A.

FIG. 2A is a front view of the spherical aberration correcting element 22 viewed from the refractive lens element 21, and FIG. 2B is a sectional view thereof. The first surface 221 of the spherical aberration correcting element 22 is a continuous surface, i.e., a flat surface or a curved surface having extremely small curvature. The second surface 222 is a grating surface on which the phase grating structure is formed. The base curve of the second surface 222 is a flat plane. The phase grating structure is formed, similar to a Fresnel lens, as a large number of concentric rings each of which has a wedge sectional shape. Each of the boundaries between the adjacent rings is formed as a step giving a predetermined optical path difference in an optical axis direction.

Figure 3A:
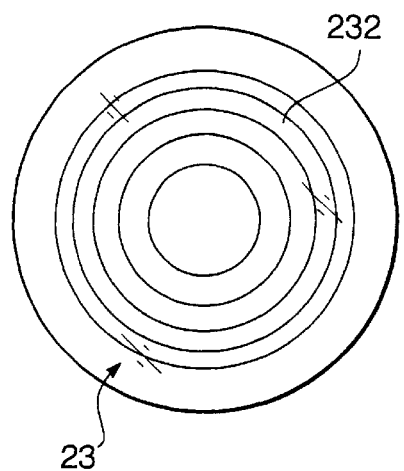
FIG. 3A is a front view of the other spherical aberration correcting element.
Figure 3A:
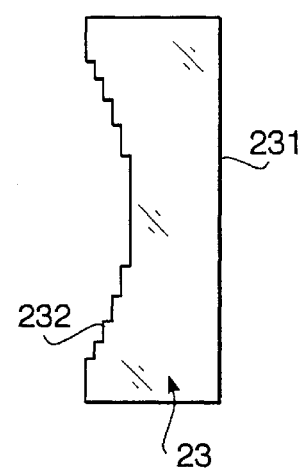

FIG. 3A is a front view of the other spherical aberration correcting element 23 and FIG. 3B is a cross-sectional view thereof. The first surface 231 of the spherical aberration correcting element 23 is a continuous surface, i.e., a flat surface or a curved surface having extremely small curvature. The second surface 232 is a grating surface on which the phase grating structure is formed. The base curve of the second surface 232 is a concave surface that is rotationally symmetrical aspherical surface. The phase grating structure is formed as a large number of concentric rings each of which has a flat surface that is perpendicular to the optical axis. Each of the boundaries between the adjacent rings is formed as a step giving a predetermined optical path difference in an optical axis direction.

FIGS. 2A, 2B, 3A and 3B emphasize the size of the rings of the phase grating structure. Actually, the height of the step equals $\lambda B/(n-1)$, i.e., about 1 $\mu$m, and the number of rings becomes a few tens. $\lambda B$ is a blazed wavelength and n is refractive index.

When the base curve of the grating surface is flat plane as shown in FIG. 2B, the lithography method is suitable to form the phase grating structure. Otherwise, when the base curve of the grating surface is curved surface as shown in FIG. 3B, the phase grating structure can be formed by the mechanical method with a lathe.

In any case, the phase grating structure has wavelength dependence such that spherical aberration changes in the undercorrected direction as wavelength of incident light increases.

The spherical aberration changes in the overcorrected direction as the thickness of the cover layer increases. Further, the phase grating structure changes the spherical aberration in the undercorrected direction as the wavelength of the incident laser beam increases. And thus, since a longer wavelength laser beam is used for the thick cover type optical disc, and a shorter wavelength laser beam is used for the thin cover type optical disc, the change of the spherical aberration due to change of the cover layer's thickness is corrected by the change of the spherical aberration due to the wavelength dependence of the phase grating structure.

An additional optical path length added by a phase grating structure is expressed by the following optical path difference function $\Phi(h)$:

$$\Phi(h) = (P_2 h^2 + P_4 h^4 + P_6 h^6 + \ldots) \times \lambda$$

where $P_2$, $P_4$ and $P_6$ are coefficients of second, fourth and sixth orders, h is a height from the optical axis and $\lambda$ is a design wavelength. The function $\Phi(h)$ represents an optical path difference between an imaginary ray that is assumed not to be diffracted by the grating and a ray that is diffracted by the grating, at a point on the phase grating structure where the height from the optical axis is h. In such an expression, a negative value of the second order coefficient $P_2$ represents a positive paraxial power of the phase grating structure. Further, the negative power increases with increasing the distance from the optical axis when the fourth order coefficient $P_4$ is larger than zero.

An actual microscopic shape of the phase grating structure is defined like a Fresnel lens having a large number of concentric rings. The actual shape $\Phi'(h)$ is defined by subtracting $\lambda \times m$ (m: integer) from $\Phi(h)$ as follows.

$$\Phi'(h) = (\text{MOD}(P_2h^2 + P_4h^4 + \ldots + C, 1) - C) \times \lambda_B$$

Symbol $\lambda_B$ is a blazed wavelength for which the steps of the grating gives an optical path difference by one wavelength, and the diffractive efficiency becomes the maximum at the blazed wavelength $\lambda_B$. Symbol C is a constant defining a phase at a boundary between adjacent rings (0=C<1). The function MOD(x, y) represents the remainder when x is divided by y. $\text{MOD}(P_2h^2 + P_4h^4 + \ldots + C, 1)$ is equal to zero at the boundary. The phase grating structure is formed on the base curve that is the lens surface of the refractive lens. Inclines and steps of the ring areas are designed such that the optical path differences are defined by $\Phi'(h)$.

The phase grating structure formed on the spherical aberration correcting element 22 satisfies the following condition (1);

$$-15 < \Phi(h_{45})/\lambda - P_2 \times (h_{45})^2 < -7 \quad (1)$$

where $h_{45}$ is the height from the optical axis of a point where a light ray whose NA is 0.45 intersects the phase grating structure.

When the condition (1) is satisfied, the variation of the spherical aberration due to change of the cover layer's thickness can be effectively counterbalanced by the variation of the spherical aberration of the phase grating structure due to the wavelength change. If the intermediate term of the condition (1) becomes lower than −15, the variation of the spherical aberration due to shift of wavelength becomes too large. On the other hand, when the intermediate term of the condition (1) exceeds −7, the variation of the spherical aberration due to shift of wavelength becomes too small, which cannot counterbalance the variation of the spherical aberration due to the change of the cover layer's thickness.

The shift of wavelength of the laser due to the change of temperature causes the backfocus of the composite objective lens 20 to change, which causes focus error. Since the change of backfocus due to temperature change are very slow, the focus error can be corrected by the focus adjusting mechanism in the optical pick-up.

On the other hand, the wavelength of the laser is rapidly changed by switching of the laser output between high and low levels during recording operation. The rapid shift of wavelength also causes the focus error, and it cannot be perfectly corrected by the focus adjusting mechanism. Thus, it is desirable that the composite objective lens 20 is constituted such that movement of the focal point is reduced.

The movement of the focal point may be reduced by correcting longitudinal chromatic aberration in general. However, since the composite objective lens 20 of the embodiment has the wavelength dependence in the spherical aberration, the perfect correction in the longitudinal chromatic aberration, on the contrary, increases the movement of the best focus position. Thus the correction of the chromatic aberration should be balanced with the variation of the spherical aberration due to shift of wavelength.

The length of the wavelength $\lambda_1$ of the laser beam for the thin cover type optical disc is preferably about 80% of the same of the wavelength $\lambda_2$ of the laser beam for the thick cover type optical disc. When the difference of the wavelengths is too small, the large number of steps are required for the phase grating structure in order to sufficiently change the spherical aberration between two wavelengths. Since the large number of steps increase loss of light quantity, the wavelengths should have a predetermined difference. Further, the phase grating becomes too sensitive to the shift of the wavelength, which narrows the tolerance to the wavelength of the semiconductor laser.

On the other hand, the difference of the wavelengths are too large, the averaged diffractive efficiency becomes too small. The diffractive efficiency of the phase grating structure is 100% at the blazed wavelength $\lambda_B$, while the larger the difference from the blazed wavelength is, the smaller the diffractive efficiency is. Since the optical pick-up of the embodiment uses two wavelengths, at least one wavelength must leave from the blazed wavelength. Thus, the large difference between the usage wavelengths decreases the averaged diffractive efficiency.

Figure 4:
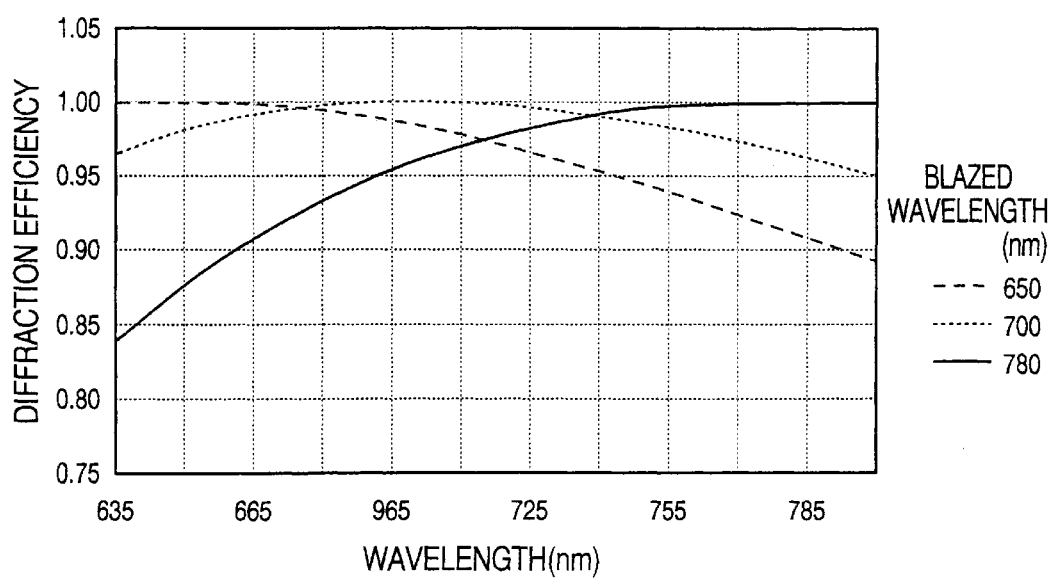
FIG. 4 is a graph showing diffraction efficiencies of phase gratings in various blazed wavelengths.

FIG. 4 is a graph showing the diffractive efficiencies when the blazed wavelength $\lambda_B$ is set at 650 nm, 700 nm or 780 nm. In any cases, the diffractive efficiencies are larger than about 90% in the range of 665 nm through 785 nm. Therefore, when the wavelengths $\lambda_1$ and $\lambda_2$ are 665 nm and 785 nm, respectively ($\lambda_1/\lambda_2 = -0.84$), the diffractive efficiencies are larger than 90% even if the blazed wavelength $\lambda_B$ has any value in the range of 665 nm through 785 nm.

The DVD requires NA of 0.60, while NA of 0.50 is enough for the CD or CD-R. The laser beam outside the NA of 0.50 has, on the contrary, a bad influence on the reproducing of the CD or CD-R. The laser beam having 0.6 in NA forms a too small beam spot for the CD or CD-R. Therefore, the peripheral region is preferable to be an exclusive use of the DVD.

For this purpose, the peripheral area of the spherical aberration correcting element 22 should be optimized for the DVD that is the thin cover type optical disc. The peripheral area is the outside of an effective diameter corresponding to NA 0.45 or NA 0.50. In other definition, the peripheral area is the outside of a 85% line of an effective diameter of the spherical aberration correcting element 22. The central area of the grating surface is a common area for the DVD, CD and CD-R, and the peripheral area of the grating surface is an exclusive area to the DVD.

The central area is formed as a grating surface. The peripheral area may be formed as a continuous surface or a grating surface. In the former case, the aberration of the peripheral area should be corrected for the DVD. In the later case, a blazed wavelength of the peripheral area should be shorter than that of the central area. When the blazed wavelength of the peripheral area is shorter than the central area, the diffractive efficiency for the CD or CD-R decreases and that for DVD increases.

Still further, spherical aberration of a positive refractive lens varies in the overcorrected direction as temperature rises due to decreasing of the refractive index, and the semiconductor laser has temperature dependence such that wavelength of the emitted laser increases as temperature rises. When the temperature rises, the refractive lens changes the spherical aberration in the overcorrected direction, and the phase grating structure changes the spherical aberration in the undercorrected direction because the wavelength of the light emitted from the semiconductor laser increases. Thus the changes of the spherical aberrations caused by the refractive lens and the phase grating structure can be counterbalanced to each other.

Therefore, when the refractive lens element 21 is made from resin whose refractive index decreases as temperature increases, the phase grating structure is desirable to be formed in the peripheral region as well as in the center region. In such a case, the phase grating structure in the peripheral region is desirable to have shorter blazed wavelength than that in the center region in order to increases the diffractive efficiency of the laser beam for the DVD.

Second Embodiment

Figure 5A:
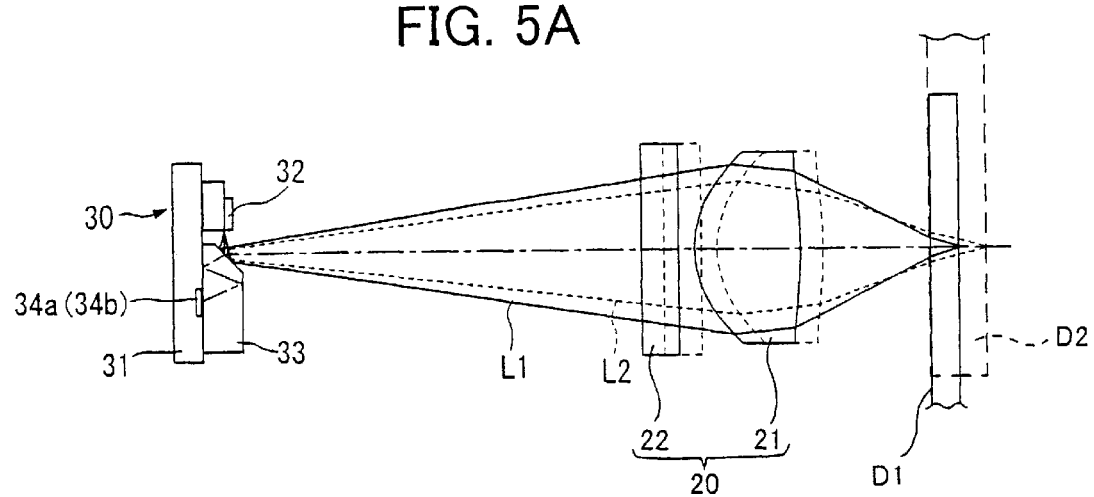
FIG. 5A shows an optical system of an optical pick-up according to a second embodiment.

FIG. 5A shows an optical system of an optical pick-up according to a second embodiment. The optical system includes a laser module 30 and the composite objective lens 20. The optical system of the second embodiment is a finite system in which divergent light beams are incident on the composite objective lens 20.

Figure 5B:
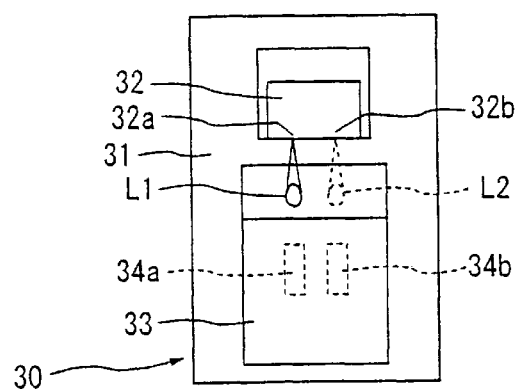
FIG. 5B is a front view of the laser module used in the optical pick-up of FIG. 5A.

The laser module 30 is, as shown in FIG. 5B, provided with one-chip semiconductor laser 32, a prism 33 and a pair of sensors 34a and 34b on a silicon substrate 31. The semiconductor laser 32 consists of a pair of different active layers on a common chip to form a pair of light emitting points 32a and 32b whose emission wavelengths are different to each other. The distance between the light emitting points is about 100 μm. The laser beam emitted from the light emitting point 32a or 32b is reflected by a 45 degrees slope of the prism 33 to be incident on the composite objective lens as a divergent light beam.

The composite objective lens 20 is similar to that of the first embodiment, it consists of the refractive lens element 21 and the spherical aberration correcting element 22.

When the thin cover type optical disc having the thin cover layer D1 is used, the light emitting point 32a is operated to emit the laser beam L1 (shown by a solid line) having shorter wavelength. The composite objective lens 20 is located at the position shown by a solid line. The laser beam L1 is converged onto the information layer of the thin cover type optical disc through the thin cover layer D1.

When the thick cover type optical disc having the thick cover layer D2 is used, the light emitting point 32b is operated to emit the laser beam L2 (shown by a dotted line) having longer wavelength. The composite objective lens 20 is moved to the position shown by a dotted line to follow the movement of the recording layer. The laser beam L2 is converged onto the information layer of the thick cover type optical disc through the thick cover layer D2.

Three concrete examples of the composite objective lens 20 according to the first embodiment will be described hereinafter. The composite objective lens 20 of the examples are designed for the compatible optical pick-up for both of the thin cover type optical disc having 0.6 mm thickness cover layer such as a DVD and the thick cover type optical disc having 1.2 mm thickness cover layer such as a CD or a CD-R. The phase grating structure is formed on the second surface 222 of the spherical aberration correcting element 22.

FIRST EXAMPLE

Figure 6:
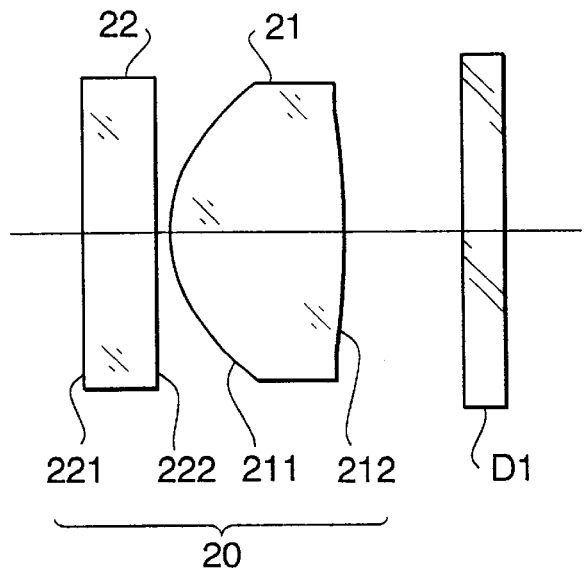
FIG. 6 is a lens diagram of a composite objective lens according to a first example with the cover layer of a thin cover type optical disc such as a DVD.
Figure 8:
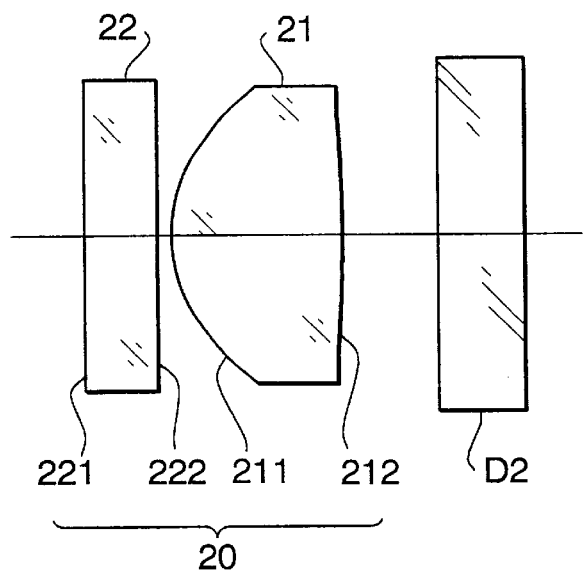
FIG. 8 is a lens diagram of the composite objective lens according to the first example with a cover layer of a thick cover type optical disc such as a CD or a CD-R.

FIG. 6 shows the composite objective lens 20 of the first example and the cover layer $D_1$ of the thin cover type optical disc. FIG. 8 shows the composite objective lens 20 with the cover layer $D_2$ of the thick cover type optical disc. The numerical constructions thereof are described in TABLE 1. The surfaces #1 and #2 represent the spherical aberration correcting element 22, the surfaces #3 and #4 represent the refractive lens element 21 and the surfaces #5 and #6 represent the cover layer of the optical disc.

In TABLE 1, NA denotes numerical aperture, f (unit: mm) denotes the total focal length, ω (unit: degree) denotes half angle of view, $\lambda_1$ (unit: nm) denotes the wavelength for the thin cover type optical disc, $\lambda_2$ (unit: nm) denotes the wavelength is for the thick cover type optical disc, $\lambda_B$ (unit: nm) denotes a blazed wavelength for the central area, $h_{45}$ (unit: mm) denotes the height from the optical axis of a point where a light ray of which NA is 0.45 intersects the phase grating structure, r (unit: mm) denotes a radius of curvature of a surface (the values at the vertex for aspherical surface), $d_1$ (unit: mm) denotes a distance between the surfaces along the optical axis for the thin cover type optical disc, $d_2$ (unit: mm) denotes the distance for the thick cover type optical disc, nλ denotes a refractive index at a wavelength λ nm and vd denotes an Abbe number.

The base curve of the surface 222 (surface #2) of the spherical aberration correcting element 22 is a flat surface. Both of the surfaces 211 and 212 of the refractive lens element 21 are also rotationally symmetrical aspherical surfaces. The rotationally symmetrical aspherical surface is expressed by the following equation:

$$X(h) = \frac{h^2 c}{1 + \sqrt{1 - (1 + K)h^2 c^2}} + A_4 h^4 + A_6 h^6 + A_8 h^8 + A_{10} h^{10} + A_{12} h^{12}$$

X(h) is a SAG, that is, a distance of a curve from a tangential plane at a point on the surface where the height from the optical axis is h. Symbol c is a curvature (1/r) of the vertex of the surface, K is a conic constant, $A_4, A_6, A_8, A_{10}$ and $A_{12}$ are aspherical surface coefficients of fourth, sixth, eighth, tenth and twelfth orders, respectively. The constant K and coefficients $A_4$ through $A_{12}$ are shown in the following TABLE 2.

Further, TABLE 2 indicates respective coefficients of second, fourth, sixth, eighth and tenth orders $P_2, P_4, P_6, P_8$ and $P_{10}$ of the optical path difference function Φ(h) to define the phase grating structure formed on the second surface 222 of the spherical aberration correcting element 22.

TABLE 1

$\lambda_1 = 657$ nm   NA 0.60   f = 3.50 mm   ω = 1.0°   $h_{45} = 1.60$ mm
$\lambda_2 = 785$ nm   NA 0.45   f = 3.52 mm   ω = 1.0°
$\lambda_B = 700$ nm

| Surface Number | r | d1 | d2 | n657 | n785 | vd |
|---|---|---|---|---|---|---|
| #1 | ∞ | 1.000 | 1.000 | 1.54056 | 1.53665 | 55.6 |
| #2 | ∞ | 0.200 | 0.200 | | | |
| #3 | 2.084 | 2.400 | 2.400 | 1.54056 | 1.53665 | 55.6 |
| #4 | −12.230 | 1.706 | 1.344 | | | |
| #5 | ∞ | 0.600 | 1.200 | | | |
| #6 | ∞ | | | | | |

TABLE 2

| | Surface #2 | Surface #3 | Surface #4 |
|---|---|---|---|
| K | — | −0.4400 | 0.0000 |
| $A_4$ | — | −1.2400 × 10$^{-3}$ | 1.9840 × 10$^{-2}$ |
| $A_6$ | — | −2.2800 × 10$^{-4}$ | −5.8000 × 10$^{-3}$ |
| $A_8$ | — | −8.6000 × 10$^{-5}$ | 4.7300 × 10$^{-4}$ |
| $A_{10}$ | — | 2.3300 × 10$^{-5}$ | 1.0200 × 10$^{-5}$ |
| $A_{12}$ | — | −6.3900 × 10$^{-6}$ | 0.0000 |
| $P_2$ | 0.0000 | | |
| $P_4$ | −1.3200 | | |
| $P_6$ | −2.1400 × 10$^{-1}$ | | |
| $P_8$ | 2.5100 × 10$^{-2}$ | | |
| $P_{10}$ | 0.0000 | | |

Figure 7A:
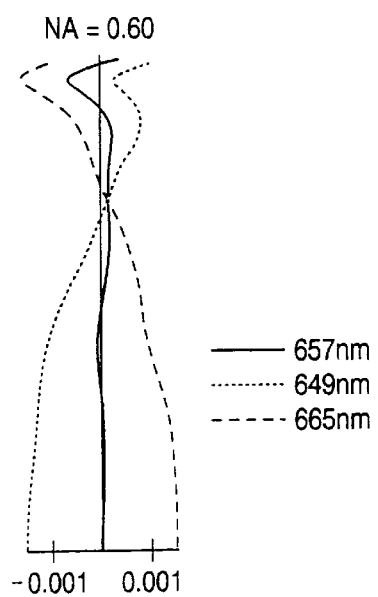
FIGS. 7A and 7B are graphs showing various aberrations of the composite objective lens according to the first example when the thin cover type optical disc is used.
Figure 7B:
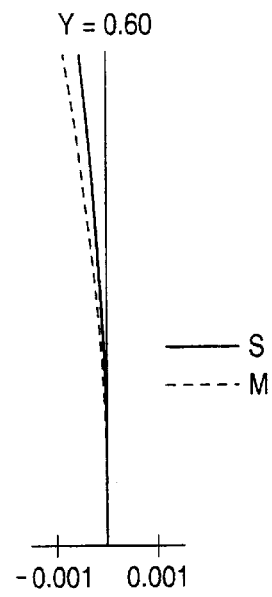

FIGS. 7A and 7B show third order aberrations of the objective lens according to the first example when the thin cover type optical disc is used at wavelength of 657 nm: FIG. 7A shows spherical aberration SA at wavelengths 649 nm, 657 nm and 665 nm: and FIG. 7B shows astigmatism (S: Sagittal, M: Meridional).

Figure 9A:
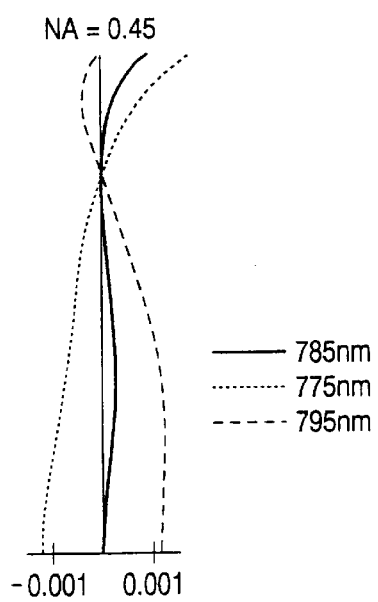
FIGS. 9A and 9B are graphs showing various aberrations of the composite objective lens according to the first example when the thick cover type optical disc is used.
Figure 9B:
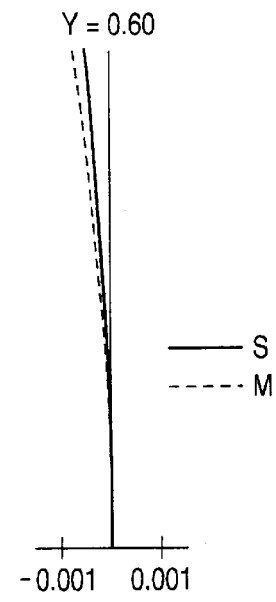

The vertical axes in FIG. 7A represents the numerical aperture NA, and the vertical axis in FIG. 4B represents image height Y. Unit of the horizontal axis is "mm" in each of FIGS. 7A and 7B. FIGS. 9A and 9B are graphs that are similar to FIGS. 7A and 7B when the thick cover type optical disc is used at wavelength of 785 nm.

The spherical aberrations sufficiently corrected at both of 657 nm and 785 nm as shown in FIGS. 7A and 9A.

In the first example, the phase grating structure is formed on the second surface 222 of the spherical aberration correcting element 22 within the entire area in an effective radius. The heights of the boundaries among the rings are shown in TABLE 3. In the first example, the base curve of the surface 222 is a flat surface as shown in FIG. 2B, the actual shape $\Delta x(h)$ of the surface 222 is directly expressed by the optical path difference function as follows:

$$\Delta x(h) = MOD(P_2 h^2 + P_4 h^4 + \ldots, 1) \times \lambda_B/(n-1).$$

TABLE 3

| Ring Number | h (mm) | Ring Number | h (mm) | Ring Number | h (mm) |
|---|---|---|---|---|---|
| 1 | 0.907 | 13 | 1.658 | 25 | 1.939 |
| 2 | 1.069 | 14 | 1.688 | 26 | 1.957 |
| 3 | 1.176 | 15 | 1.715 | 27 | 1.975 |
| 4 | 1.258 | 16 | 1.742 | 28 | 1.993 |
| 5 | 1.326 | 17 | 1.767 | 29 | 2.011 |
| 6 | 1.384 | 18 | 1.791 | 30 | 2.027 |
| 7 | 1.434 | 19 | 1.815 | 31 | 2.044 |
| 8 | 1.480 | 20 | 1.837 | 32 | 2.060 |
| 9 | 1.521 | 21 | 1.859 | 33 | 2.076 |
| 10 | 1.559 | 22 | 1.880 | 34 | 2.092 |
| 11 | 1.594 | 23 | 1.900 | | |
| 12 | 1.627 | 24 | 1.920 | | |

The central area that is the inside of $h_{45}$ (=1.600 mm) covers the rings whose numbers are 1 though 11, and the peripheral area that is the outside of $h_{45}$ covers the rings whose number are 12 through 34. The blazed wavelength in the central area is equal to 700 nm and the blazed wavelength of the peripheral area is equal to 657 nm. That is, the peripheral area is optimized for the DVD.

SECOND EXAMPLE

Figure 10:
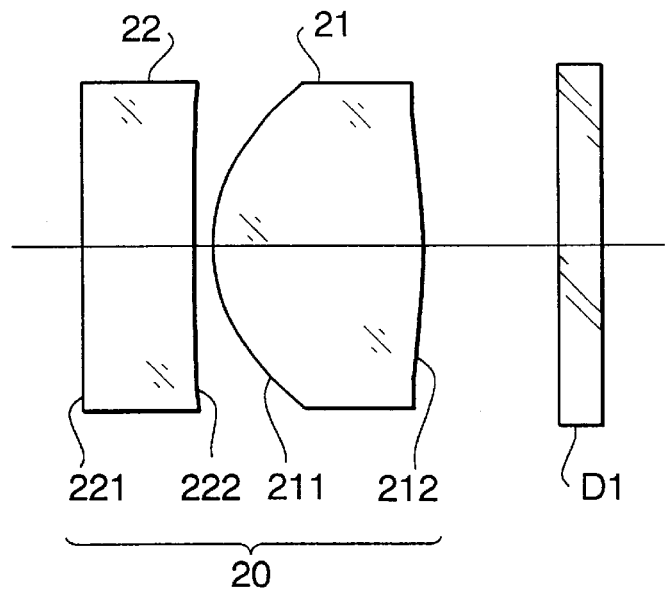
FIG. 10 is a lens diagram of a composite objective lens according to a second example with the cover layer of the thin cover type optical disc.
Figure 12:
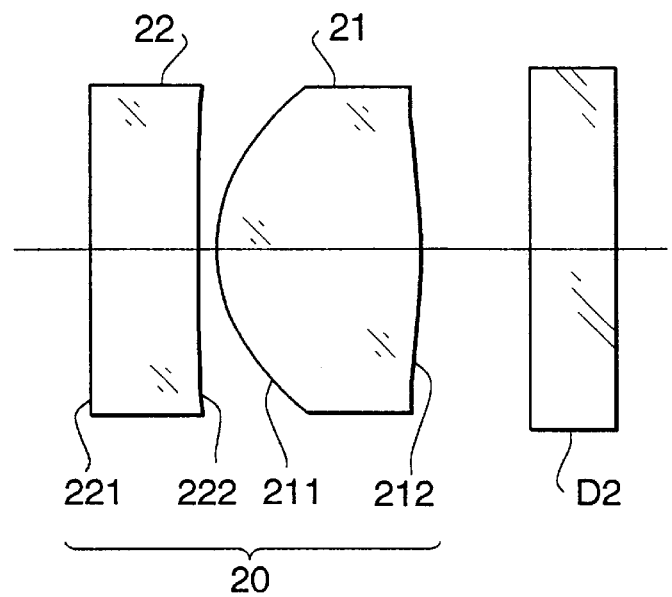
FIG. 12 is a lens diagram of the composite objective lens according to the second example with a cover layer of the thick cover type optical disc.

FIG. 10 shows the composite objective lens 20 of the second example and the cover layer $D_1$ of the thin cover type optical disc. FIG. 12 shows the composite objective lens 20 with the cover layer $D_2$ of the thick cover type optical disc. The numerical constructions thereof are described in TABLE 4. TABLE 5 represents the conic constants, the aspherical coefficients and the coefficients of the optical path difference function.

TABLE 4

$\lambda_1 = 657$ nm  NA 0.60  f = 3.80 mm  $\omega = 0.9°$  $h_{45} = 1.72$ mm
$\lambda_2 = 780$ nm  NA 0.50  f = 3.82 mm  $\omega = 0.9°$
$\lambda_B = 700$ nm

| Surface Number | r | d1 | d2 | n657 | n785 | vd |
|---|---|---|---|---|---|---|
| #1 | ∞ | 1.500 | 1.500 | 1.54056 | 1.53677 | 55.6 |
| #2 | ∞ | 0.250 | 0.250 | | | |
| #3 | 2.434 | 2.840 | 2.840 | 1.54056 | 1.53677 | 55.6 |
| #4 | −7.826 | 1.862 | 1.500 | | | |

TABLE 4-continued $\lambda_1 = 657$ nm  NA 0.60  f = 3.80 mm  $\omega = 0.9°$  $h_{45} = 1.72$ mm
$\lambda_2 = 780$ nm  NA 0.50  f = 3.82 mm  $\omega = 0.9°$
$\lambda_B = 700$ nm

| Surface Number | r | d1 | d2 | n657 | n785 | vd |
|---|---|---|---|---|---|---|
| #5 | ∞ | 0.600 | 1.200 | | | |
| #6 | ∞ | | | | | |

TABLE 5

| | Surface #2 | Surface #3 | Surface #4 |
|---|---|---|---|
| K | 0.0000 | −0.4400 | 0.0000 |
| $A_4$ | $1.500 \times 10^{-3}$ | $-4.2045 \times 10^{-4}$ | $1.4000 \times 10^{-2}$ |
| $A_6$ | 0.0000 | $-9.6210 \times 10^{-5}$ | $-3.1400 \times 10^{-3}$ |
| $A_8$ | $1.500 \times 10^{-5}$ | $4.2851 \times 10^{-6}$ | $3.0500 \times 10^{-4}$ |
| $A_{10}$ | 0.0000 | $-4.6156 \times 10^{-6}$ | $-8.0000 \times 10^{-6}$ |
| $A_{12}$ | 0.0000 | $-4.0000 \times 10^{-7}$ | 0.0000 |
| $P_2$ | 0.0000 | | |
| $P_4$ | −1.1551 | | |
| $P_6$ | 0.0000 | | |
| $P_8$ | $-1.1550 \times 10^{-2}$ | | |
| $P_{10}$ | 0.0000 | | |

Figure 11A:
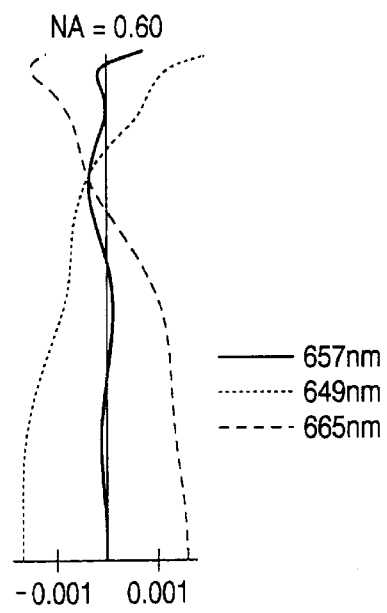
FIGS. 11A and 11B are graphs showing various aberrations of the composite objective lens according to the second example when the thin cover type optical disc is used.
Figure 11B:
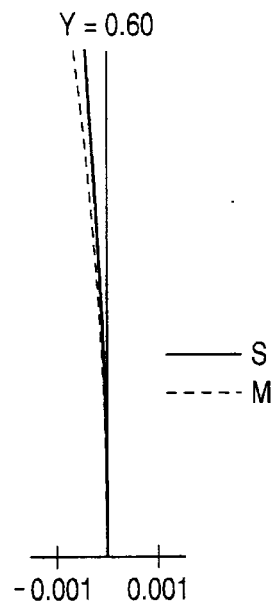
Figure 13A:
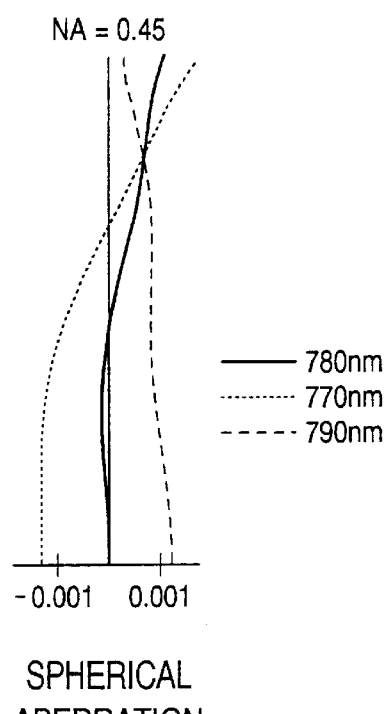
FIGS. 13A and 13B are graphs showing various aberrations of the composite objective lens according to the second example when the thick cover type optical disc is used.
Figure 13B:
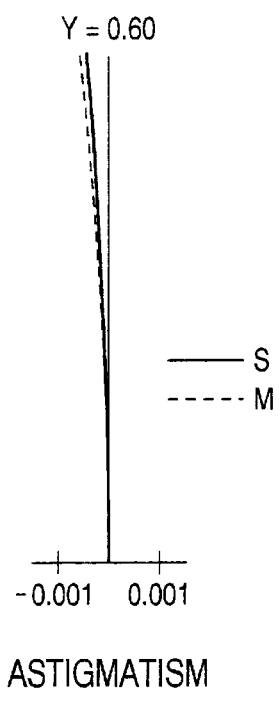

FIGS. 11A and 11B show spherical aberration and astigmatism when the thin cover type optical disc is used at wavelength of 657 nm. FIGS. 13A and 13B show spherical aberration and astigmatism when the thick cover type optical disc is used at wavelength of 780 nm.

In the second example, the phase grating structure is formed on the aspherical base curve. Accordingly, the spherical aberration of the phase grating structure can be counterbalanced with the spherical aberration of the aspherical base curve with keeping the wavelength dependence of the spherical aberration correcting element 22. This minimize bending of a light ray at the spherical aberration correcting element 22, which reduces the change of various aberrations due to change of distance between the refractive lens element 21 and the spherical aberration correcting element 22.

The actual shape of the grating surface is defined to overlap the phase grating structure represented by the optical path difference function described above on the base curve. As a result, the surface of the each ring is a flat surface that is perpendicular to the optical axis as shown in FIG. 3B. The step T is equal to $\lambda_B/(n-1) = 0.0007/(1.53906-1) = 0.0013$ (mm). That is, the step is 1.3 μm.

THIRD EXAMPLE

Figure 14:
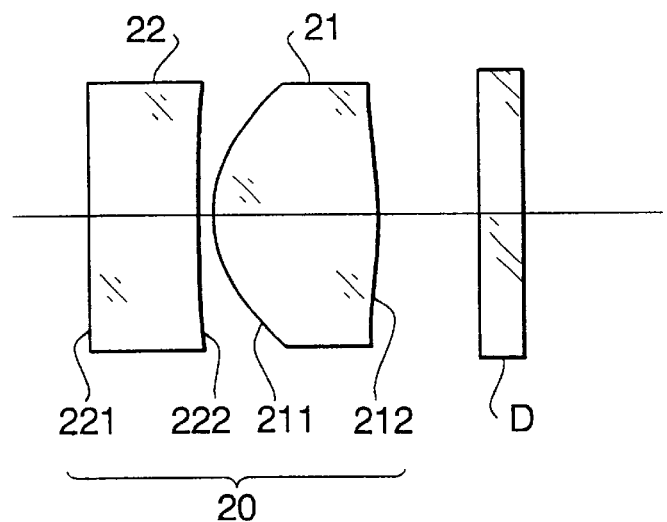
FIG. 14 is a lens diagram of a composite objective lens according to a third example with the cover layer of the thin cover type optical disc.
Figure 16:
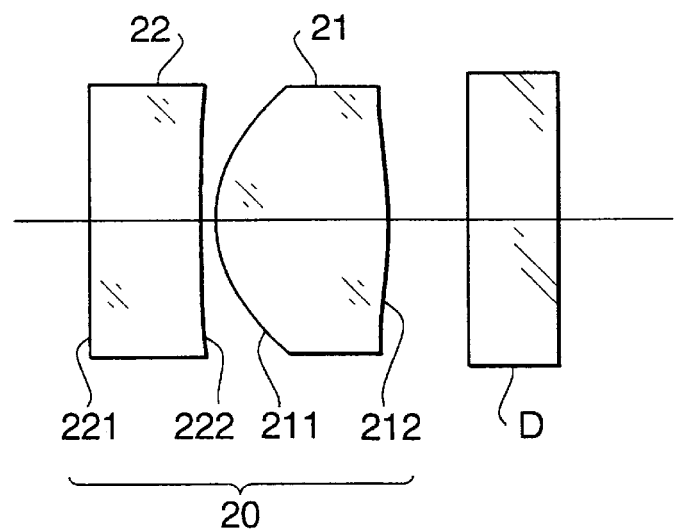
FIG. 16 is a lens diagram of the composite objective lens according to the third example with a cover layer of the thick cover type optical disc.

FIG. 14 shows the composite objective lens 20 of the third example and the cover layer $D_1$ of the thin cover type optical disc. FIG. 16 shows the composite objective lens 20 with the cover layer $D_2$ of the thick cover type optical disc. The numerical constructions thereof are described in TABLE 6. TABLE 7 represents the conic constants, the aspherical coefficients and the coefficients of the optical path difference function.

TABLE 6

$\lambda_1 = 657$ nm    NA 0.60    f = 3.06 mm    $\omega = 1.1°$    $h_{45} = 1.38$ mm
$\lambda_2 = 780$ nm    NA 0.50    f = 3.08 mm    $\omega = 1.1°$
$\lambda_3 = 657$ nm

| Surface Number | r | d1 | d2 | n657 | n785 | vd |
|---|---|---|---|---|---|---|
| #1 | ∞ | 1.500 | 1.500 | 1.54056 | 1.53677 | 55.6 |
| #2 | ∞ | 0.200 | 0.200 | | | |
| #3 | 1.954 | 2.287 | 2.287 | 1.54056 | 1.53677 | 55.6 |
| #4 | −6.293 | 1.421 | 1.500 | | | |
| #5 | ∞ | 0.600 | 1.200 | | | |
| #6 | ∞ | | | | | |

TABLE 7

| | Surface #2 | Surface #3 | Surface #4 |
|---|---|---|---|
| K | 0.0000 | −0.4430 | 0.0000 |
| $A_4$ | $3.200 \times 10^{-3}$ | $-8.8000 \times 10^{-4}$ | $2.6900 \times 10^{-2}$ |
| $A_6$ | $2.300 \times 10^{-4}$ | $-1.5100 \times 10^{-4}$ | $-9.3440 \times 10^{-3}$ |
| $A_8$ | $3.800 \times 10^{-5}$ | $-8.5000 \times 10^{-5}$ | $1.4050 \times 10^{-3}$ |
| $A_{10}$ | 0.0000 | $3.0000 \times 10^{-7}$ | $-5.7000 \times 10^{-5}$ |
| $A_{12}$ | 0.0000 | $-8.0200 \times 10^{-6}$ | 0.0000 |
| $P_2$ | 0.0000 | | |
| $P_4$ | −2.6326 | | |
| $P_6$ | $-1.8917 \times 10^{-1}$ | | |
| $P_8$ | $-3.1279 \times 10^{-2}$ | | |
| $P_{10}$ | 0.0000 | | |

Figure 15A:
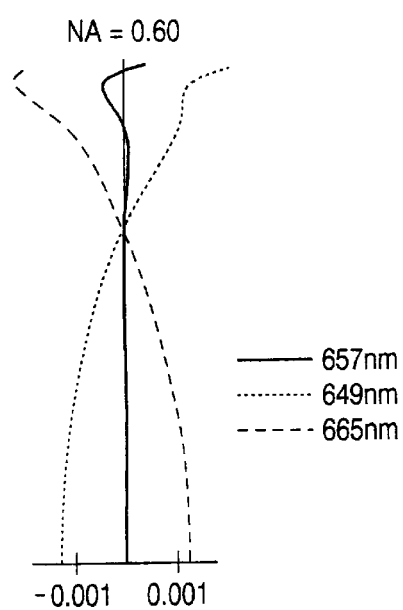
FIGS. 15A and 15B are graphs showing various aberrations of the composite objective lens according to the third example when the thin cover type optical disc is used.
Figure 15B:
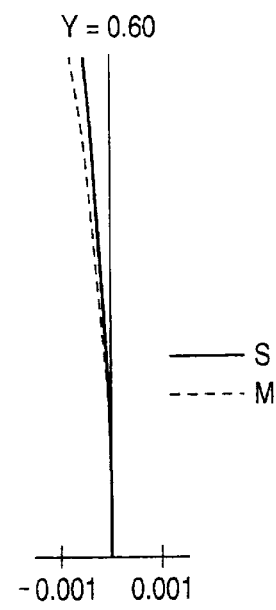
Figure 17A:
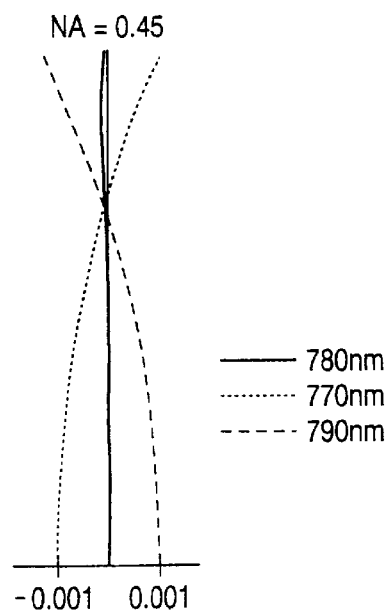
FIGS. 17A and 17B are graphs showing various aberrations of the composite objective lens according to the third example when the thick cover type optical disc is used.
Figure 17B:
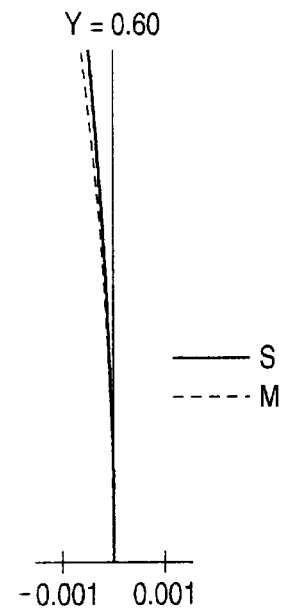

FIGS. 15A and 15B show spherical aberration and astigmatism when the thin cover type optical disc is used at wavelength of 657 nm. FIGS. 17A and 17B show spherical aberration and astigmatism when the thick cover type optical disc is used at wavelength of 780 nm.

In the third example, the phase grating structure is formed on the aspherical base curve as well as the second example. Accordingly, the spherical aberration of the phase grating structure can be counterbalanced with the spherical aberration of the aspherical base curve with keeping the wavelength dependence of the spherical aberration correcting element 22.

The actual shape of the grating surface is defined to overlap the phase grating structure represented by the optical path difference function described above on the base curve. As a result, the surface of the each ring is a flat surface that is perpendicular to the optical axis as shown in FIG. 3B. The step T is equal to $\lambda_B/(n-1)=0.000657/(1.54056-1)=0.00122$ (mm). That is, the step is 1.22 $\mu$m.

In this case, the spherical aberration correcting element 22 has no spherical aberration at 657 nm. Therefore, the refractive lens element 21 that has no aberration in NA 0.60 is used with the spherical aberration correcting element 22. The peripheral area of the grating surface of the spherical aberration correcting element 22 is formed as a continuous surface. The peripheral area contributes to form a beam spot with the light beam at 657 nm without light loss due to the phase grating structure. On the other hand, the peripheral portion does not contribute to form a beam spot with the light beam at 780 nm, which can avoid to form too small beam spot for the CD or CD-R.

The following TABLE 8 shows the values of the first to three examples for the condition (1). Since all of the embodiments satisfy the condition (1), the deterioration of the wave front aberration due to change of the cover layer's thickness can be reduced.

TABLE 8

| | Examples | | |
|---|---|---|---|
| | First Example | Second Example | Third Example |
| Condition (1) | −11.2 | −10.9 | −11.2 |

$\Phi(h_{45})/\lambda - P_2 \times (h_{45})^2$

The present disclosure relates to the subject matter contained in Japanese Patent Application No. HEI 11-002563, filed on Jan. 8, 1999, which is expressly incorporated herein by reference in its entirety.

What is claimed is:

1. An optical pick-up that is used for at least two kinds of optical discs respectively provided with cover layers having different thicknesses, said optical pick-up comprising:

a plurality of light sources that emit light beams having different wavelengths, said plurality of light sources being switched with each other according to the kind of optical disc used;

a refractive lens element that converges said light beams from said plurality of light sources onto recording layers of said optical discs; and a spherical aberration correcting element on which a concentric phase grating structure is formed, said phase grating structure altering a spherical aberration in response to a change of wavelength to correct a change of the spherical aberration due to a change of the thickness of said cover layer, wherein said spherical aberration correcting element is located between said plurality of light sources and said refractive lens element, said phase grating structure having a wavelength dependence such that said spherical aberration varies in an undercorrected direction as a wavelength of incident light increases, the following condition (1) being satisfied:

$$-15 < \Phi(h_{45})/\lambda - P_2 \times (h_{45})^2 < -7 \quad (1)$$

where $h_{45}$ is the height from the optical axis of a point where a light ray of which NA is 0.45 intersects said phase grating structure, $\lambda$ is a design wavelength, and $P_2$ is a second order coefficient when an additional optical path length added by said phase grating structure is expressed by the following optical path difference function $\Phi(h)$:

$$\Phi(h)=(P_2h^2+P_4h^4+P_6h^6+ \ldots )\times\lambda$$

where $P_4$ and $P_6$ are coefficients of forth and sixth orders, and h is a height from the optical axis.

2. The optical pick-up according to claim 1, said spherical aberration correcting element diffracting said light beams in a same diffractive order, said concentric phase grating structure being formed on a rotationally symmetrical aspherical surface of said spherical aberration correcting element.

3. The optical pick-up according to claim 2, wherein said spherical aberration correcting element has no paraxial power.

4. The optical pick-up according to claim 2, wherein one of said plurality of light sources having shorter emitting wavelength is used for one kind of said optical discs having a thinner cover layer that has higher recording density, and wherein another of said light sources having longer emitting wavelength is used for another kind of said optical discs having a thicker cover layer that has lower recording density.

5. The optical pick-up according to claim 4, wherein a peripheral area of the grating surface of said spherical aberration correcting element is formed as a continuous surface optimized for the one kind of optical disc having the thinner cover layer, said peripheral area is outside of an effective diameter corresponding to a numerical aperture required for the another kind of optical disc having the thicker cover layer.

6. The optical pick-up according to claim 4, wherein a peripheral area of the grating surface of said spherical aberration correcting element has a different phase grating structure from that of a central area, said phase grating structure of said peripheral area is optimized for the one kind of optical disc having the thinner cover layer, and wherein said peripheral area is outside of an effective diameter corresponding to a numerical aperture required for the another kind of optical disc having the thicker cover layer.

7. The optical pick-up of claim 6, wherein a blazed wavelength of said phase grating structure in said peripheral area is shorter than a blazed wavelength of said phase grating structure in said central area.

8. The optical pick-up according to claim 2, further comprising a collimator lens located between said plurality of light sources and said spherical aberration correcting element to convert divergent light beams into parallel light beams.

9. The optical pick-up according to claim 2, wherein divergent light beams emitted from said plurality of light sources are incident on said spherical aberration correcting element.

10. A objective lens of an optical pick-up that is used for at least two kinds of optical discs respectively provided with cover layers having different thicknesses, said composite objective lens comprising:

a refractive lens element having a positive power; and a spherical aberration correcting element on which a concentric phase grating structure is formed, said phase grating structure altering a spherical aberration in response to a change of a wavelength to correct a change of the spherical aberration due to a change of the thickness of said cover layer, wherein said phase grating structure has a wavelength dependence such that said spherical aberration varies in an undercorrected direction as a wavelength of incident light increases, and wherein the following condition (1) is satisfied:

$$-15 < \Phi(h_{45})/\lambda - P_2 \times (h_{45})^2 < -7 \quad (1)$$

where $h_{45}$ is the height from the optical axis of a point where a light ray of which NA is 0.45 intersects said phase grating structure, $\lambda$ is a design wavelength, and $P_2$ is a second order coefficient when an additional optical path length added by said phase grating structure is expressed by the following optical path difference function $\Phi(h)$:

$$\Phi(h)=(P_2h^2+P_4h^4+P_6h^6+ \ldots )\times\lambda$$

where $P_4$ and $P_6$ are coefficients of forth and sixth orders, and h is a height from the optical axis.

11. The objective lens of an optical pick-up according to claim 10, said spherical aberration correcting element diffracting light beams having different wavelengths in a same diffractive order, said concentric phase grating structure being formed on a rotationally symmetrical aspherical surface of said spherical aberration correcting element.

12. The composite objective lens according to claim 11, wherein said spherical aberration correcting element has no paraxial power.

13. The composite objective lens according to claim 11, wherein said refractive lens element is a double-aspherical and single-piece lens.

14. The composite objective lens according to claim 11, wherein one surface of said spherical aberration correcting element comprises a continuous surface and an other surface comprises said phase grating structure.

15. The composite objective lens according to claim 11, wherein said phase grating structure is formed within a central area of the grating surface of said spherical aberration correcting element, and a peripheral area of said grating surface is formed as a continuous surface, and wherein said peripheral area and said central area are divided by a 85% line of an effective diameter of said spherical aberration correcting element.

16. The composite objective lens according to claim 11, wherein said phase grating structure is formed in the entire area of the grating surface of said spherical aberration correcting element, a blazed wavelength of said phase grating structure in a peripheral area of said grating surface is shorter than a blazed wavelength of a central area of said grating surface, and wherein said peripheral area and said central area are divided by a 85% line of an effective diameter of said spherical aberration correcting element.

17. A spherical aberration correcting element that is used in combination with a refractive lens element in an optical pick-up that is used for at least two kinds of optical discs respectively provided with cover layers having different thickness, said correcting element comprising:

a concentric phase grating structure that alters a spherical aberration in response to a change of a wavelength to correct a change of the spherical aberration due to a change of the thickness of said cover layer, wherein said concentric phase grating structure has a wavelength dependence such that a spherical aberration varies in an undercorrected direction as a wavelength of an incident light increases, and wherein the following condition (1) is satisfied:

$$-15 < \Phi(h_{45})/\lambda - P_2 \times (h_{45})^2 < -7 \quad (1)$$

where $h_{45}$ is the height from the optical axis of a point where a light ray of which NA is 0.45 intersects said phase grating structure, $\lambda$ is a design wavelength, and $P_2$ is a second order coefficient when an additional optical path length added by said phase grating structure is expressed by the following optical path difference function $\Phi(h)$:

$$\Phi(h)=(P_2h^2+P_4h^4+P_6h^6+ \ldots )\times\lambda$$

where $P_4$ and $P_6$ are coefficients of forth and sixth orders, and h is a height from the optical axis.

18. The spherical aberration correcting element according to claim 17, wherein light beams having different wavelengths are diffracted in a same diffractive order, said concentric phase grating structure being formed on a rotationally symmetrical aspherical surface of said spherical aberration correcting element.

19. The spherical aberration correcting element according to claim 18, wherein a paraxial power is not provided.

20. The spherical aberration correcting element according to claim 18, wherein one surface is a continuous surface and the other surface is the grating surface.

21. The spherical aberration correcting element according to claim 18, wherein said concentric phase grating structure is formed within a central area of a grating surface, and a peripheral area of said concentric phase grating surface is formed as a continuous surface, and wherein said peripheral area and said central area are divided by a 85% line of an effective diameter.

22. The spherical aberration correcting element according to claim 18, wherein said concentric phase grating structure is formed in an entire area of a grating surface, a blazed wavelength of said concentric phase grating structure in a peripheral area of said grating surface being shorter than a blazed wavelength of a central area of said grating surface, and wherein said peripheral area and said central area are divided by a 85% line of an effective diameter.

* * * * *